(12) United States Patent
Wang et al.

(10) Patent No.: US 7,925,092 B2
(45) Date of Patent: Apr. 12, 2011

(54) HAND WRITING INPUT DEVICE

(75) Inventors: Ziyan Wang, Shanghai (CN); Xuming Zhang, Beijing (CN)

(73) Assignee: GM Global Technology Operations LLC, Detroit, MI (US)

( * ) Notice: Subject to any disclaimer, the term of this patent is extended or adjusted under 35 U.S.C. 154(b) by 1139 days.

(21) Appl. No.: 10/578,109

(22) PCT Filed: Nov. 3, 2003

(86) PCT No.: PCT/CN03/00931
§ 371 (c)(1),
(2), (4) Date: May 1, 2006

(87) PCT Pub. No.: WO2005/043366
PCT Pub. Date: May 12, 2005

(65) Prior Publication Data
US 2007/0063967 A1 Mar. 22, 2007

(51) Int. Cl.
*G06K 9/00* (2006.01)
*G09G 5/00* (2006.01)
(52) U.S. Cl. .................... 382/187; 382/189; 345/156
(58) Field of Classification Search .......... 382/187, 382/189; 345/156, 157, 158
See application file for complete search history.

(56) References Cited

U.S. PATENT DOCUMENTS

| | | | |
|---|---|---|---|
| 6,411,280 B1 | 6/2002 | Aarts et al. | |
| 6,473,069 B1 | 10/2002 | Gerpheide | |
| 6,498,601 B1 | 12/2002 | Gujar et al. | |
| 2002/0145592 A1* | 10/2002 | Schauer | 345/156 |
| 2003/0083020 A1 | 5/2003 | Langford | |

FOREIGN PATENT DOCUMENTS

| | | |
|---|---|---|
| CN | 1152734 | 6/1997 |
| CN | 1271883 | 11/2000 |
| EP | 0640948 | 11/1997 |
| EP | 0977142 | 2/2000 |
| EP | 1014295 | 6/2000 |
| EP | 1286250 | 2/2003 |
| EP | 1293882 | 3/2003 |
| JP | 07295706 | 11/1995 |
| JP | 11134103 | 5/1999 |
| JP | 2000-259350 | 9/2000 |
| JP | 00/276284 | 10/2000 |
| JP | 01/109560 | 4/2001 |
| JP | 01/265490 | 9/2001 |
| JP | 01/282433 | 10/2001 |
| JP | 01/290416 | 10/2001 |
| JP | 02/232317 | 8/2002 |
| JP | 02/259044 | 9/2002 |
| WO | WO 02/077786 | 10/2002 |
| WO | WO 03/019373 | 3/2003 |

* cited by examiner

*Primary Examiner* — John B Strege

(57) ABSTRACT

A hand-writing input device comprises: an input surface, a guidance device provided on the input surface along a predetermined track to guide a finger or pen along the track; a plurality of switch elements provided at particular positions on the track. When a particular character is inputted, the triggered switch element outputs the corresponding signal, and the combinations of the signals outputted by the switch elements correspond to the inputted characters. Since hand-writing input is performed by guiding a finger or pen along a predetermined track, only few switch elements are needed, thereby simplifying hand-writing recognition, reducing software requirements and increasing recognition accuracy.

29 Claims, 8 Drawing Sheets

| NUMERAL | 1 | 2 | 3 | 4 | 5 | 6 | 7 | 8 | 9 | 0 | | | |
|---|---|---|---|---|---|---|---|---|---|---|---|---|---|
| KEYPAD COMBINATION | 5a, 10a | 1a, 5a, 6a, 7a, 11a | 1a, 5a, 6a, 10a, 11a | 2a, 5a, 6a, 10a | 1a, 2a, 6a, 10a, 11a | 1a, 2a, 6a, 7a, 10a, 11a | 1a, 5a, 10a | 1a, 2a, 5a, 6a, 7a, 10a, 11a | 1a, 2a, 5a, 6a, 10a | 1a, 2a, 4a, 5a, 7a, 8a, 10a, 11a | | | |

| ALPHABET | A | B | C | D | E | F | G | H | I | J | K | L | M |
|---|---|---|---|---|---|---|---|---|---|---|---|---|---|
| KEYPAD COMBINATION | 4a, 5a, 6a, 8a, 10a | 1a, 2a, 4a, 6a, 7a, 9a, 11a | 1a, 2a, 7a, 11a | 1a, 3a, 5a, 8a, 10a, 11a | 1a, 2a, 6a, 7a, 11a | 1a, 2a, 6a, 7a | 1a, 2a, 7a, 9a, 11a | 2a, 5a, 6a, 7a, 10a | 2a, 7a | 5a, 7a, 10a, 11a | 2a, 4a, 6a, 7a, 9a, 11a | 2a, 7a, 11a | 2a, 3a, 4a, 5a, 7a, 10a |

| ALPHABET | N | O | P | Q | R | S | T | U | V | W | X | Y | Z |
|---|---|---|---|---|---|---|---|---|---|---|---|---|---|
| KEYPAD COMBINATION | 2a, 3a, 5a, 7a, 9a, 10a | 1a, 2a, 5a, 7a, 10a, 11a | 1a, 2a, 5a, 6a, 7a, 11a | 1a, 2a, 5a, 7a, 9a, 10a, 11a | 1a, 2a, 5a, 6a, 7a, 9a | 1a, 2a, 3a, 5a, 7a, 9a, 11a | 1a, 4a, 6a, 8a, 11a | 2a, 5a, 7a, 10a, 11a | 2a, 4a, 7a, 8a | 2a, 5a, 7a, 8a, 9a, 10a | 3a, 4a, 8a, 9a | 3a, 4a, 8a | 1a, 4a, 8a, 11a |

*Figure 6*

| NUMERAL | 1 | 2 | 3 | 4 | 5 | 6 | 7 | 8 | 9 | 0 | | | |
|---|---|---|---|---|---|---|---|---|---|---|---|---|---|
| KEYPAD COMBINATION | 3a 5a 6a | 1a 3a 4a 5a 7a | 1a 3a 4a 6a | 2a 3a 4a 6a | 1a 2a 4a 6a | 1a 2a 4a 5a 6a | 1a 2a 3a 6a 7a | 1a 2a 3a 4a 5a 6a 7a | 1a 2a 3a 4a 6a 7a | 1a 2a 3a 5a 6a 7a | | | |
| ALPHABET | A | B | C | D | E | F | G | H | I | J | K | L | M |
| KEYPAD COMBINATION | 1a 2a 3a 4a 5a 6a | 2a 4a 5a 6a 7a | 1a 2a 5a 7a | 3a 4a 5a 6a 7a | 1a 2a 4a 5a 7a | 1a 2a 4a 5a | 1a 2a 3a 4a 6a 7a | 2a 4a 5a 6a | 2a 5a | 3a 5a 6a 7a | 2a 4a 5a 6a 7a | 2a 5a 7a | 1a 2a 3a 5a 6a |
| ALPHABET | N | O | P | Q | R | S | T | U | V | W | X | Y | Z |
| KEYPAD COMBINATION | 4a 5a 6a | 1a 2a 3a 4a 5a | 1a 2a 3a 4a 5a | 4a 5a 6a 7a | 4a 5a 7a | 2a 4a 6a 7a | 2a 3a 4a 5a 7a | 2a 4a | 5a 6a 7a | 2a 3a 4a 5a 6a 7a | 2a 3a 4a 5a 6a 7a | 2a 3a 4a 5a | 1a 4a 7a |

| NUMERAL | 1 | 2 | 3 | 4 | 5 | 6 | 7 | 8 | 9 | 0 | | | |
|---|---|---|---|---|---|---|---|---|---|---|---|---|---|

*(7-segment digit representations)*

| ALPHABET | A | B | C | D | E | F | G | H | I | J | K | L | M |
|---|---|---|---|---|---|---|---|---|---|---|---|---|---|

*(7-segment alphabet representations)*

| ALPHABET | N | O | P | Q | R | S | T | U | V | W | X | Y | Z |
|---|---|---|---|---|---|---|---|---|---|---|---|---|---|

*(7-segment alphabet representations)*

Figure 12

| NUMERAL | 1 | 2 | 3 | 4 | 5 | 6 | 7 | 8 | 9 | 0 | | | |
|---|---|---|---|---|---|---|---|---|---|---|---|---|---|
| KEYPAD COMBINATION | 3f<br>6f | 1f<br>3f<br>4f<br>5f<br>7f | 1f<br>3f<br>4f<br>6f<br>7f | 2f<br>3f<br>4f<br>6f | 1f<br>2f<br>4f<br>6f<br>7f | 1f<br>2f<br>4f<br>5f<br>6f<br>7f | 1f<br>3f<br>6f | 1f<br>2f<br>3f<br>4f<br>5f<br>6f<br>7f | 1f<br>2f<br>3f<br>4f<br>6f | 1f<br>2f<br>3f<br>5f<br>6f<br>7f | | | |
| ALPHABET | A | B | C | D | E | F | G | H | I | J | K | L | M |
| KEYPAD COMBINATION | 1f<br>2f<br>3f<br>4f<br>5f<br>6f | 2f<br>4f<br>5f<br>6f<br>7f | 1f<br>2f<br>5f<br>7f | 3f<br>4f<br>5f<br>6f<br>7f | 1f<br>2f<br>4f<br>5f<br>6f<br>7f | 1f<br>2f<br>4f<br>5f | 1f<br>2f<br>3f<br>4f<br>6f<br>7f | 2f<br>4f<br>5f<br>6f | 2f<br>5f | 3f<br>6f<br>7f | 2f<br>4f<br>5f<br>6f | 2f<br>5f<br>7f | 1f<br>2f<br>3f<br>5f<br>6f |
| ALPHABET | N | O | P | Q | R | S | T | U | V | W | X | Y | Z |
| KEYPAD COMBINATION | 4f<br>5f<br>6f | 1f<br>2f<br>3f<br>4f<br>5f | 1f<br>2f<br>3f<br>4f | 4f<br>5f<br>6f<br>7f | 2f<br>4f<br>5f | 2f<br>4f<br>5f | 2f<br>3f<br>4f<br>5f<br>6f<br>7f | 2f<br>4f | 4f<br>5f | 2f<br>3f<br>4f<br>5f<br>6f<br>7f | 2f<br>3f<br>4f<br>5f<br>6f<br>7f | 2f<br>3f<br>4f<br>5f<br>6f<br>7f | 1f<br>4f<br>7f |

Figure 13

HAND WRITING INPUT DEVICE

FIELD OF THE INVENTION

The present invention broadly relates to handwriting input device, and more specifically to a character handwriting input device having a guide to facilitate blind input of information.

BACKGROUND OF THE INVENTION

As is generally known, the basic and most frequently used characters are the numerals from 0 to 9 and the 26 English letters. These numerals and letters are widely used in character input devices used in cell phones, palm PC, etc. There are two techniques used for inputting these characters. One technique consists of providing a corresponding key for each character, as is often used in the keyboard of a palm PC, and the other consists of representing a plurality of characters by a single key, and selecting different characters by pressing the same key multiple times, as is commonly employed by cell phone keypads.

Blind input of information is very import in some applications, such as in dialing a cell phone when driving. Therefore, various input devices using touch guidance have been developed that allow information to be input into a device without the aid of sight. Touch guidance refers to the technique of employing convex or concave shapes in touch-sensitive surfaces that are intended to be contacted by the fingertips. It enables the user to recognize the position of an individual input key through the finger touch, thereby enhancing the user's ability to input information into a device without looking at the device, i.e., blind input. There are two major types of resistive touch sensitive screens (or touch panels) based on the different structural features of the touch sensitive screen, i.e., resistive digital matrix type touch sensitive screens and resistive analog type touch sensitive screens.

The digital matrix type touch sensitive screen is primarily used for individual keypad operation. It comprises an individual easy-touch keypad for a performing specific function, while also permitting the keypad to be switched between on and off. Digital matrix type touch sensitive screens are widely used in display devices for providing public information, industrial equipment control panel and computer input/output devices.

As an input device for character input, the digital matrix type touch sensitive screen provides corresponding keypads for each letter and numeral, therefore the number of keypads corresponds to the number of the letters and numerals that are to be input. The keypads must be physically tapped in order to input information, making it difficult to input the information blindly, or provide a keypad layout that can be miniaturized.

One of the popular applications of analog type touch sensitive screen is the hand-writing board used in palm PCs and mini-notebooks. Existing hand-writing character (including letters and numerals) input technology includes an analog touch panel with thousands (or more) matrix sensor units for sensing input written strokes, an MPU (processing unit) for encoding, decoding and data transmission as well as hand-writing recognition software. Hand-writing recognition accuracy, which has always been a major concern in these hand-writing boards, is made more difficult by the need for the user to write the strokes in a predetermined order in order to be accurately recognized.

SUMMARY OF THE INVENTION

An object of the present invention is to provide a technique for inputting character information that is compatible with a human's handwriting habits without the need for large amounts of hand-writing recognition software, and which improves hand-writing accuracy while facilitating blind input in a device that is easily miniaturized.

According to the preferred embodiment of the present invention, a character input device is provided, comprising a hand-writing board with an input surface; a guidance device provided on the input surface along a predetermined track, and which limits the direction of a hand-writing input stroke during the input to guide the hand-writing to following the predetermined track; a plurality of switch elements provided at particular positions on the predetermined track, such that when a specific character is input by hand-writing, the triggered switch element among the plurality of switch elements will produce a corresponding output, and the combination of the outputs of the switch elements correspond to the input character.

Since hand-writing input is made along the predetermined track under the guidance of the guidance device, only few switch elements are needed. Thus, compared with the prior art analog type input device, the present invention greatly simplifies hand-writing recognition, obviates the need for large amounts of recognition software and increases hand-writing recognition accuracy. Compared with prior art digital type input devices, the present invention greatly reduces the size of the device, thus permitting greater miniaturization and enabling blind input.

The predetermined track is preferably a pattern composed of a first plurality of lengths and a second plurality of lengths. The first plurality of lengths includes the lengths between each two adjacent points of a first plurality of points Pi sequentially arranged on a closed curve; the second plurality of lengths is formed by the length starting from a point inside of the closed curve and ending at each of the second plurality of points Pj on the closed curve.

The first plurality of lengths include six lengths, P1P2, P2P3, P3P4, P4P5, P5P6, and P6P1, which are formed by the curve between each two adjacent points of the first plurality of points P1, P2, P3, P4, P5 and P6 sequentially arranged on the closed curve, while said second plurality of lengths includes six lengths, P0P1, P0P3, P0P4, P0P5, P0P6, which are formed by the length starting from a point P0 inside of the closed curve and ending at each of the second plurality of points P1, P2, P3, P4, P5 and P6 on the closed curve.

The first plurality of lengths includes six lengths P1P2, P2P3, P3P4, P4P5, P5P6, and P6P1, that are formed by the curve between each two adjacent points of the first plurality of points P1, P2, P3, P4, P5 and P6 sequentially arranged on the closed curve, while the second plurality of lengths includes two lengths P0P1 and P0P4, that are formed by the length starting from a point P0 inside of the closed curve and ending at each of said second plurality of points P1 and P4 on said closed curve The first plurality of lengths includes six lengths P1P2, P2P3, P3P4, P4P5, P5P6, and P6P1, that are formed by the curves between each two adjacent points of the first plurality of points P1, P2, P3, P4, P5 and P6 sequentially arranged on the closed curve, while the second plurality of lengths includes eight lengths P0P1, P0P2, P0P23, P0P3, P0P4, P0P5, P0P56 and P0P6, that are formed by the length starting from a point P0 inside of the closed curve and ending at each of the second plurality of points P1, P2, P23, P3, P4, P5, P56 and P6 sequentially arranged on the closed curve.

The pattern formed by the first plurality of lengths and the second plurality of lengths is substantially center symmetrical.

The pattern formed by the first plurality of lengths and the second plurality of lengths is substantially axially symmetrical.

The closed curve formed by the first plurality of lengths is one selected from the group including a rectangle and rectangle-like shapes, an ellipse and elliptical-like shapes, and an octagon and octagonal-like shapes.

The switch elements may be located as follows: a switch element maybe arranged on each of the first plurality of lengths; a switch element may be arranged on at least one of the two lengths P1P0 and P0P4 in the second plurality of lengths; and a switch element may be arranged on each of the remaining lengths.

The guidance device may be one selected from the group comprising a visual guidance device composed of a visual track per se, a touch guidance device composed of a concave shape with the switch element disposed therein or a convex shape with the switch element disposed thereon.

The cross-sections of the concave type guidance device and the convex type guidance device are substantially trapezoid or semicircle.

The switch element is preferably one selected from the group comprising a resistive switch, an electro-optical switch, a mechanical switch and a capacitive switch.

The input surface features a touch sensitive screen, and the resistive switch is the keypad defined on said touch sensitive screen.

The input characters may include numerals, letters and characters defined by the user.

The hand-writing input device of the present invention further includes: a micro-processor unit and a memory, wherein the micro-processor unit obtains codes of characters corresponding to the switch signal combinations from the predetermined inquiry table stored in the memory according to the combination switch signals from the sensitive unit, and then outputs them.

The interfaces used by the output include any of the following: serial, parallel communication, USB, infrared or blue-tooth.

A micro-processor is used to receive the combinations from the outputs of the switch elements, the micro-processor obtains codes of characters corresponding to the combinations of the outputs of the switch elements from a memory storing a predetermined inquiry table, and outputs them through an interface.

The hand-writing input device according to the present invention enables the user to input characters using his finger or a pen on the digital type matrix touch sensitive screen with the aid of the guidance device arranged along the strokes, and such input method is similar to hand-writing input performed on an analog type touch sensitive screen.

In an input combination, the characteristic strokes of the characters are recognized by judging whether the several keypads (switch elements) are pressed. In the preferred embodiment, only 7 or 11 keypads are used to achieve hand-writing input of letters, numerals and other characters. Compared with the prior art hand-writing input technique, the present invention reduces the number of keys and the size of the key board, simplifies the recognition software program and provides higher accuracy of recognition.

These and other advantages and features of the invention will be made clear or will become apparent during the course of the following description of a preferred embodiment of the present invention.

BRIEF DESCRIPTION OF THE DRAWINGS

In the drawings which form an integral part of the specification and are to be read in conjunction therewith, and in which like reference numerals are employed to designate identical components in the various views:

FIG. 6 is a stroke definition table for the embodiment shown in FIGS. 1 and 3.

FIG. 12 is a table relating stroke segments with corresponding characters.

FIG. 13 is a code table relating keypads to output characters.

DETAILED DESCRIPTION OF THE INVENTION

Figure 1:
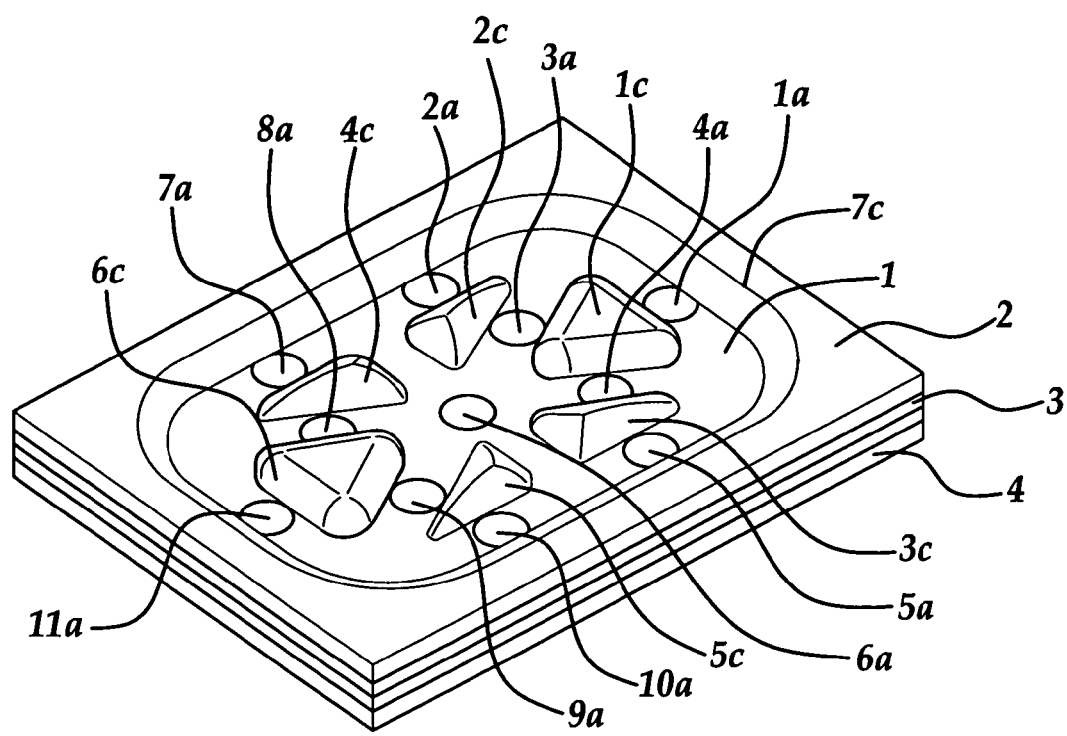
FIG. 1 is a perspective view of the frame structure for an input device forming one embodiment of the present invention.

The present invention provides a hand-writing recognition device, which enables a user to easily input information on a touch sensitive screen, using a finger or pen with the aid of the guidance device. The hand-writing input recognition device correctly recognizes the inputs and outputs the corresponding characters or instructions.

In one embodiment of the present invention, the input device comprises a hand-writing board which uses a matrix touch sensitive screen having a certain number of stroke segments thereon and keypads. The keypads include switch elements arranged on the stroke segments, to allow the user to input information by touching or pressing different combinations of the keypads. The switch elements may comprise resistive touch sensitive screen/switches, optical-electrical switches, mechanical switches, capacitive switches, inductive switches or other touch sensitive members and their associated processing units. Input by the user results in these switch elements outputting a "1" or a "0", i.e., an "on" or "off" signal status.

In the present embodiment, the guidance device comprises a grooved device arrangement, however, the guidance device may also be in the form of convex shape or other distinctive shape arranged on the surface of the touch sensitive screen, with the guidance device being provided along the input strokes of the characters.

Through the use of the guidance device, the user is assured that the input made with a finger or pen follows the correct stroke. There are shallow recesses in the intersections of the guidance grooves, so that the finger making input may stop at the recess when it is sensed, thereby avoiding the need for the user to visually guide his finger stroke.

The keypad array of the touch sensitive screen is connected to an MPU system and associated circuits, which includes software program to support MPU operations. The MPU scans the keypad array to determine if any keypad has been touched (pressed) and stores the scanned "on" status of the key in memory as the input.

When a user inputs information using either a finger or pen and the guidance provided by the guidance groove, a series of keypads are be pressed and these pressed keypads trigger the corresponding "on" signals being generated. The "on" status of these keypads are detected by the MPU and stored therein. In this embodiment, an inputted series of keypad combination represents a character input which is processed by the software in the MPU.

In each of the embodiments of the present invention, a time delay method is adopted to judge whether the process of inputting a character has been completed. When a keypad is pressed and released, a clock circuit starts a pre-selected time delay to determine the ending of the character input process. If no keypad input occurs within the time delay, the input process is deemed finished. It should be noted here however, that other methods could be adopted to indicate the ending of a character input process, such as pressing a particular preset key.

During the process of inputting a character, the input combination composed of a series of "on" status signals will be stored and compared with the predefined "on" status signal combination stored in the code table in the MPU. If any corresponding input combination is found in the code table, the MPU will output a character signal or an instruction signal through an RS232 communication serial interface (or parallel communication interface, USB interface, infrared interface, blue-tooth or other communication methods). If the input combination does not match any of the combinations in the code table, the input will be ignored and an instruction will be sent to a loudspeaker at the same time, and an audible tone from the loudspeaker will announce the invalid input.

In the present embodiment, in connection with the inputting of one character or instruction, multiple actuations of the same keypad are treated only as one valid keypad input.

The hand-writing input device according to the present invention enables the user to make hand-writing input on analog type touch sensitive screens or the user may also input characters using his fingers or a pen on the digital matrix touch sensitive screen with the aid of the guidance device which is arranged along the strokes. During an input combination, the characteristic strokes of the character are be recognized by determining whether the keypads are pressed. Compared with the currently available hand-writing input techniques, the present invention reduces the number of keys and the size of the keyboard, simplifies the recognition software program and provides higher accuracy of recognition.

Referring now particularly to FIG. 1, a framed star type handwriting board 2 is shown, which includes a matrix type touch sensitive screen 1, a glass or polymer base 4 and a touch surface 3 disposed beneath the board 2. The matrix type touch sensitive screen 1 includes 11 keypads which form an array, comprising keypads 1a-11a. In one practical embodiment, the size of the touch sensitive screen may be, for example, 35 mm in width and 45 mm in length.

Figure 2:
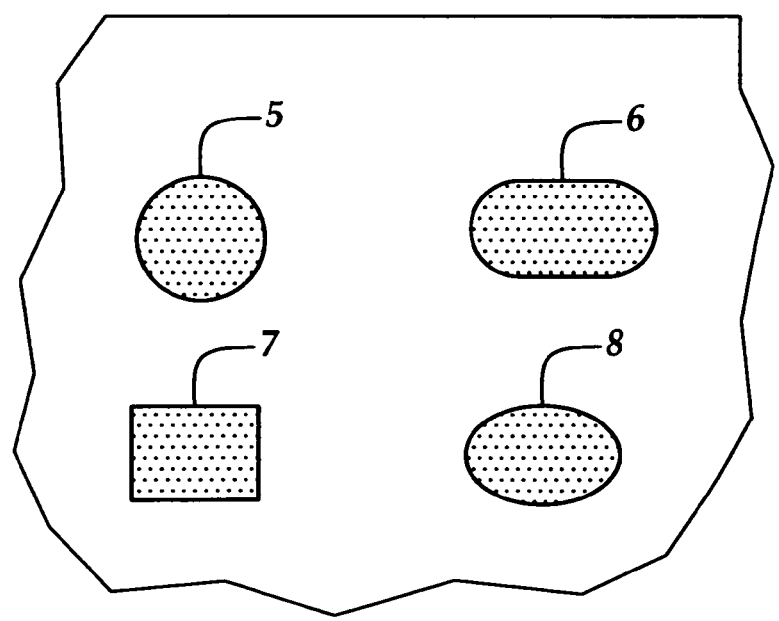
FIG. 2 is a plan view showing the shapes of the selectable keypad.

FIG. 2 shows the shapes of the selectable keypad, which include a circular disc 5 having a diameter, for example of 3-6 mm, a rounded-rectangle 6 having a width, for example of 3-6 mm and a length of 5-8 mm, a rectangle 7 or an ellipse 8.

Figure 3:
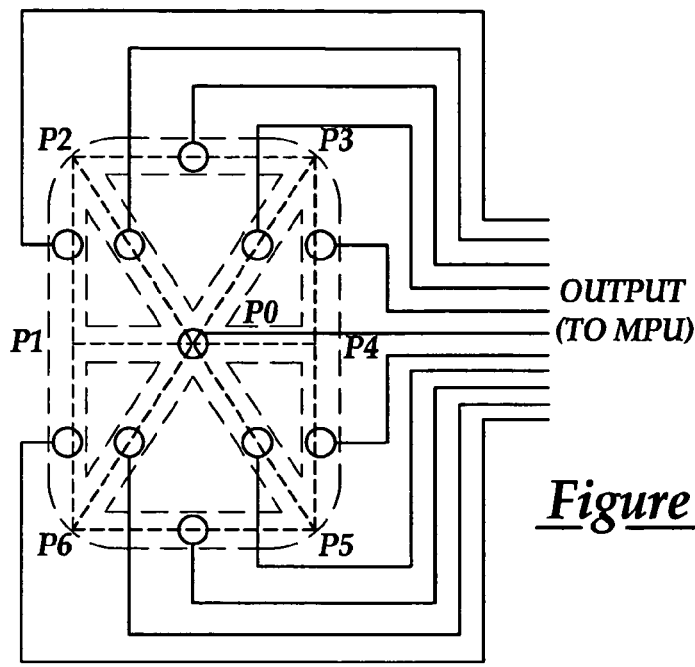
FIG. 3 is a plan view of the structure of a stroke-segment.

FIG. 3 is a schematic drawing showing the arrangement of the structure that defines the stroke segments of the input unit, wherein broken lines indicate the pattern formed by the input tracks, hatched portions indicate the layout of the guidance device and the black dots represent the keypads, i.e., switch elements. The lead-out wire from each switch element represents the output wire of the switch element. Since the details of the switch elements and the means of powering it are generally known to those skilled in the art, they need not be described herein. The stroke layout comprises 11 stroke segments, i.e., P1P2, P2P3, P3P4, P4P5, P5P6, P6P1 and P0P2, P0P3, P0P5, P0P6 and P1P0P4, with each stroke segment provided with a switch element (keypad). In one embodiment, the stroke segment may be between 4-6 mm in width. For clarity of illustration, these stroke segments are shown as being divided into independent stroke segments. Each stroke segment is provided with a keypad, and the ten numerals, 26 English letters and other characters or control instructions can be represented by different input combinations formed by these 11 stroke segments or by the output combination of the switch elements. Outputs from a plurality of switch elements are connected to an MPU for signal processing, the details of which will be described later. However, the switch elements can be connected to other devices such as a PC or display device, either directly or through appropriate interfaces.

In the present description, the distance between two points such as P1P2 will be referred to as a length. One stroke segment may be a length or it may be composed of two or more lengths. For example, the above-mentioned stroke segment P1P0P4 is composed by two lengths P1P0 and P0P4.

Figure 4:
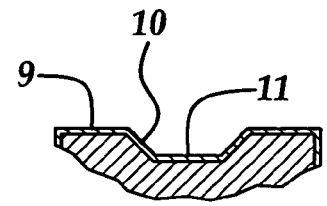
FIG. 4 is a cross-sectional view of the concave shaped projection formed on the touch sensitive screen.

As shown in FIG. 4, the above-mentioned stroke segment is surrounded by seven projections having a pre-selected height, which may be, for example 0.5-1.5 mm, i.e., the six triangular projections as shown in FIG. 1, 1c-6c and an edge projection 7c. These projections are formed on the surface of the touch sensitive screen. As shown in FIG. 4, the projections of the touch sensitive screen surface form a slope 10 from the upper surface 9 to the lower surface 11, so that a concave shallow recess is formed, thus guiding the user to write along the correct strokes when inputting handwriting using finger touch.

Figure 5:
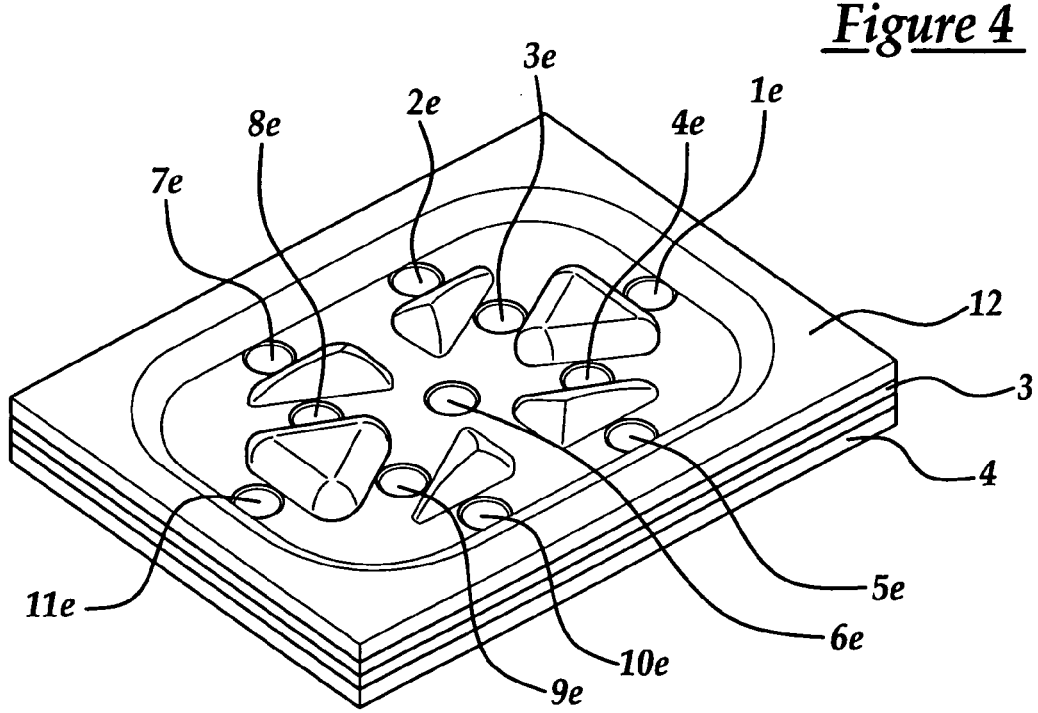
FIG. 5 is a perspective view of the frame structure showing details of the guidance device.

Referring now to FIG. 5, the guidance groove may comprise a separate, independent guidance groove plate 12. The guidance groove plate 12 covers the surface 34 of the touch sensitive screen 1, and the structure and size of its projections are the same as those of the unit FIG. 1. Eleven groove holes 1e-11e are distributed on the bottom of the guidance groove plate 12 which respectively correspond to the keypad array on the touch sensitive screen. In this embodiment, the groove hole is in the form of a circle having a diameter that is greater than that of the keypad by about 1.0-1.5 mm. The thickness of the bottom of the groove plate 12 may be about 0.2 mm and the height of the projection may be about 0.5-1.5 mm.

FIG. 6 shows a keypad combination definition table of the handwriting input unit shown in FIG. 1, having 11 keypad units (such as those shown in FIG. 3), representing both numerals and letters. When the user input a character using a finger or pen on the touch sensitive screen, for example, the numeral 8, the keypads of the eight stroke segments representing "8", i.e., 1a-11a are pressed. Pressing of these keypads sequentially trigger the switch elements, producing "on" status signals from the corresponding keypads. In the present embodiment, different keypad serial combinations represent different characters.

As shown in FIG. 3, it should be noted that each of lengths P1P0 and P0P4 may be defined as a stroke segment without making any other changes, that is, arranging a switch element on each of P1P0 and P0P4. On the basis of such a structure, those skilled in the art may easily design a definition table that is the same as or different from the definition table shown in FIG. 6.

In the present invention, the definition of the keypad combination represents the combination of the keypads that are pressed to form a character or letter, but not the arrangement thereof. In other words, changing the order in which the keypads are pressed will not change the keypad combination per se, and the numeral 1 could be produced by pressing either be keypads 5*b* and 10*b* or keypads 10*b* and 5*b*.

Figures 7, 8:
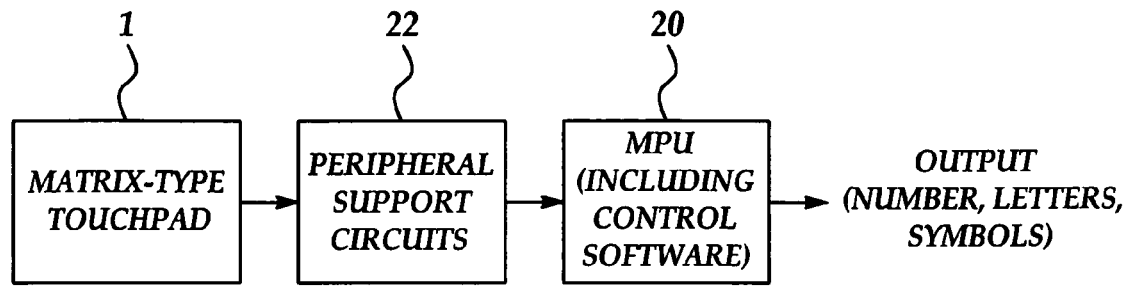
FIG. 7 is a block diagram of the input device and related processing circuits.
FIG. 8 is a predefined code table relating output characters with the keypads.

FIG. 7 is a block diagram showing the hand-writing device of the present invention and associated processing circuits, including the touchpad 1, an MPU and memory 20, and peripheral support circuitry 22. The MPU 20 uninterruptedly scans the keypad array 1 to detect whether any of the keypads is pressed. The "on" status and "off" status of the keypad indicates respectively that the keypad is pressed or not pressed. The "on" status is stored in the memory 20 and processed after when input of the character have been completed. An input combination is a series of keypad input combinations in an input process and the input process is divided by predetermined time intervals. The time intervals are predetermined by a clock circuit (forming part of the support circuits 22) to separate one input combination from the next input combination. In the present embodiment, the time interval is pre-set to be, for example 300 ms. Keypad inputs made within the predetermined time interval are considered as the same input combination. In the present embodiment, multiple depressions of the same keypad are treated as a single valid input. As an input combination is performed, the "on" status of a series of the corresponding keypads that have been pressed are stored in the memory 20.

The keypad combination shown in FIG. 8 is a predefined code table relating keypad combinations with letters and numerals, which is stored in memory. A predefined input combination represents a particular numeral or letter and produces the corresponding output. The input combination is compared with the predefined combination in the code table. If the input combination matches a predefined combination in the code table, the MPU outputs a character signal (or instruction signal), and in the present embodiment, an ASCII character code is outputted. If no predefined input combination in the code table matches the input combination, the MPU will process the input as invalid input, and in this event, the MPU sends an instruction to speaker or other annunciator to indicate that the input combination is an undefined (unrecognized) keypad combination. In this embodiment, an RS232 serial communication interface is used as the preferred output interface.

Figure 9:
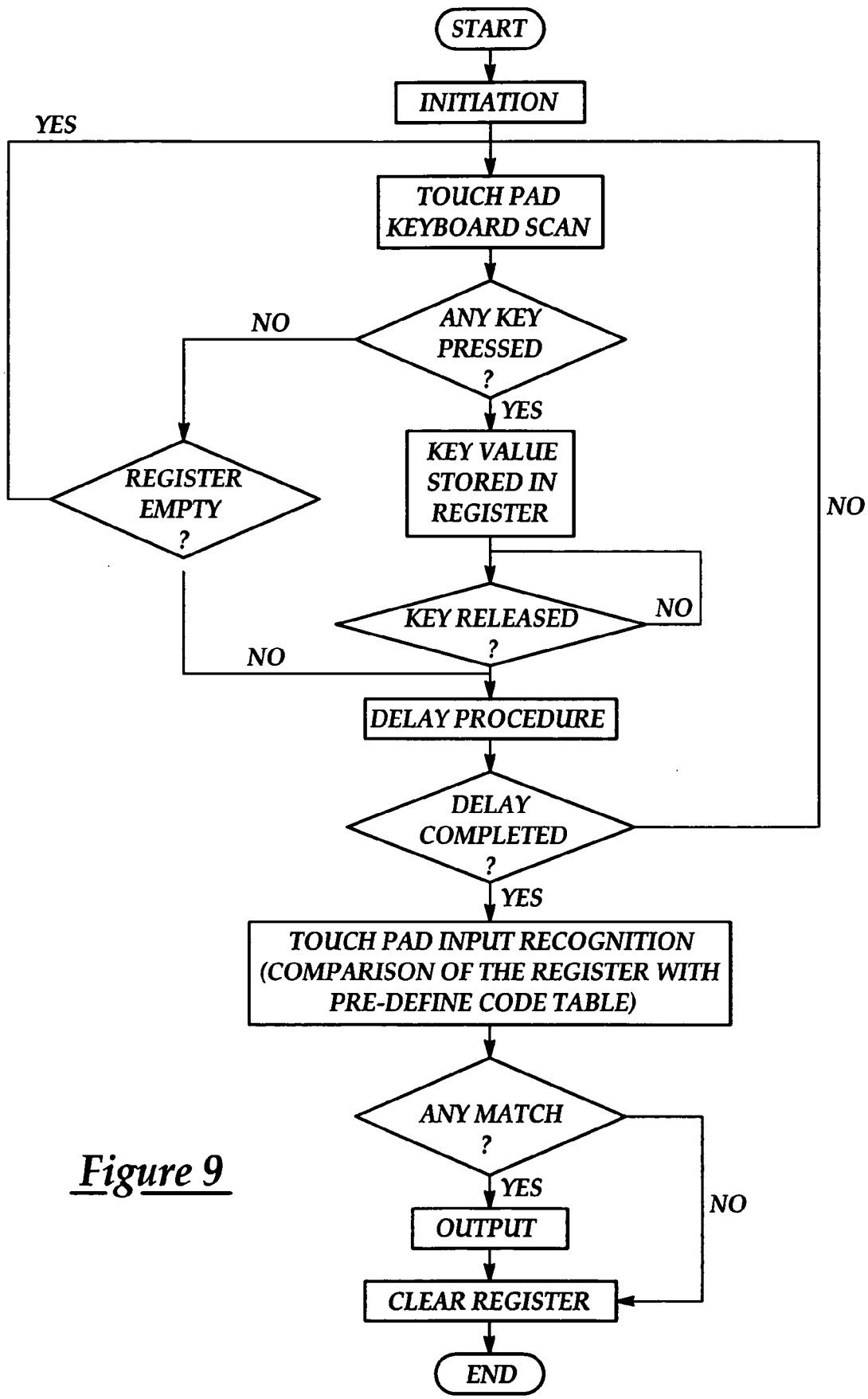
FIG. 9 is a software flow chart showing the operation of the software used to control the input device.

FIG. 9 is a software flowchart showing the operation of the software that controls the operations of the MPU and processing of the input combination. After the program is started and initiated, voltage is applied to the keypad array and the status of each keypad is detected by measuring the output voltage of the keypad. The program continues scanning each keypad so as to detect the "on" status of the pressed keypad. Pressing the first keypad initiates the start of the input process.

The program stores the "on" status of the pressed keypad in the memory, and start a time delay program when the keypad is released. The program executes the above-mentioned operation on each pressed keypad. The detection of the depression of a new keypad within the time delay interval means that the input process is not finished, consequently the scanning process is continued until no further keypad depressions are detected within the time delay period. When an "on" status is not detected within time delay, the scanning process is terminated and a series of "on" status are sequentially stored in the memory, following which the MPU processes the input data.

The input combination is compared with the predefined combination in the code table. If there is a matching combination, the program outputs an ASCII character code; if there is no matching combination, the program causes a signal to be sent to a speaker circuit to announce that the input is invalid. The program will then clear the memory register, and ends.

Figure 10:
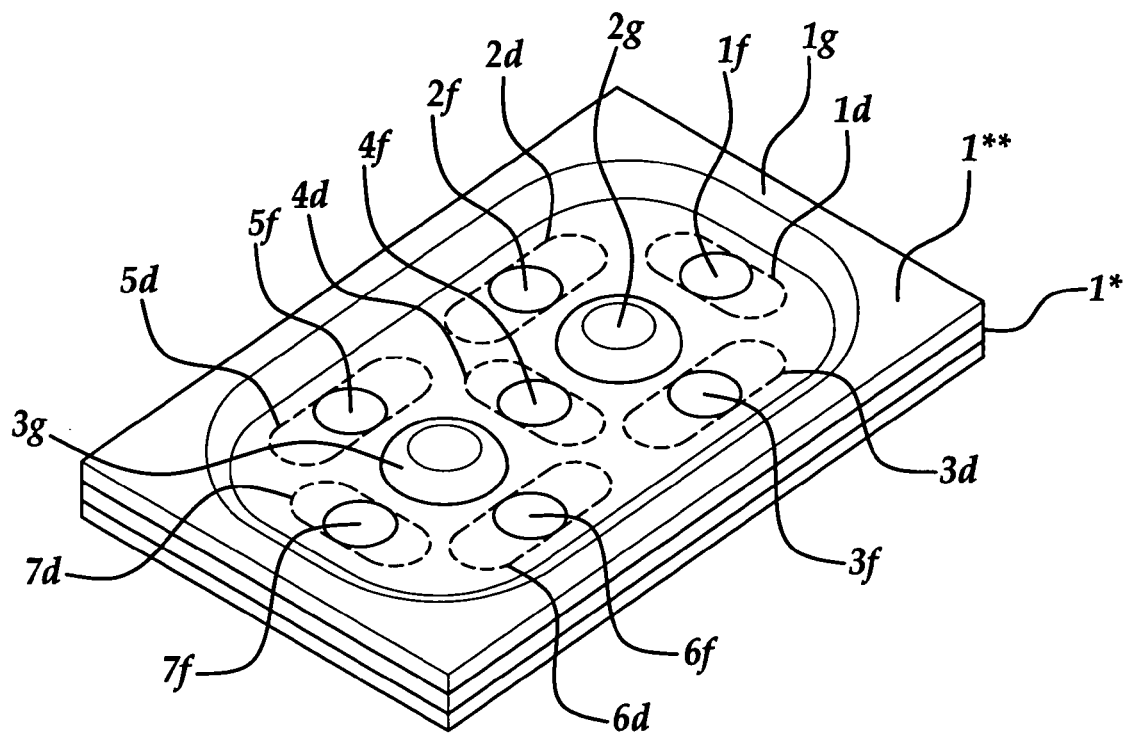
FIG. 10 is a perspective view of an alternate embodiment of the input unit.

An alternative embodiment of the invention will now be described which uses the numeral "8" as a basis for the formation of keystrokes, and in this connection reference is made to FIG. 10. Except for the construction of the stroke segment, this embodiment is substantially the same as the embodiment shown in FIG. 1. The matrix type touch sensitive screen of the number "8" model shown in FIG. 10 comprises 7 keypads 1*f*, 2*f*, 3*f*, 4*f*, 5*f*, 6*f* and 7*f*. In this embodiment, the touch sensitive screen may be, for example 30-40 mm in width and 40-50 in length.

Figure 11:
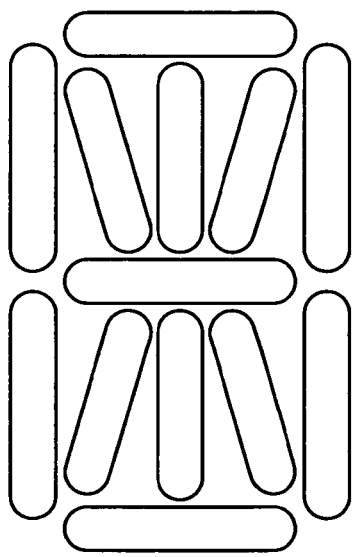
FIG. 11 is a diagrammatic view showing the stoke segments of used in the input unit.

FIG. 11 illustrates the configuration of the stroke segment of the numeral "8" model, which is configured by stroke segments of P1P2, P2P3, P3P4, P4P5, P5P6, P6P1 and P1P0P4. As shown in FIG. 10, the guidance groove surrounds the above-mentioned seven stroke segments, which may have a width, for example of 4-6 mm, i.e., 1*d*, 2*d*, 3*d*, 4*d*, 5*d*, 6*d*, 7*d*, which are equivalent to P1P2, P2P3, P3P4, P4P5, P5P6, P6P1 and P1P0P4 in FIG. 11, and the seven stroke segments form the shape of the numeral 8. These stroke segments are separated into independent stroke segments in order to be clearly distinguished, and each stroke segment is arranged on a keypad. The ten numerals and 26 English letters and some other characters or control instructions can be represented by different combinations of the seven stroke segments. The table shown in FIG. 12 relates the seven stroke segments with corresponding characters.

In the present embodiment, the track of the guidance groove is formed by a rounded frame having a width, for example of 6 mm and a horizontal stoke having the same width placed in the center of the frame. The shallow recessed guidance groove is formed by edge projection 1*g*, upper projection 2*g* and lower projection 3*g*. The inner shape of the edge projection is a rounded-rectangle having its top edge sloping down to the groove bottom. The upper and lower projections are in the shape of a disc with a diameter of, for example of 6-8 mm and its edge also slopes down from top to bottom. The upper and lower projection could also be in the shape of ellipse and raindrop shape with curves (see FIG. 10).

FIG. 13 is a table relating the predefined keypad codes to numerals and letters. This table is used for the numeral "8" embodiment model having seven keypads as shown in FIG. 10, i.e., 1*f*, 2*f*, 3*f*, 4*f*, 5*f*, 6*f* and 7*f*. For example, the keypad combination formed by keypad 1*f*, 2*f*, 3*f*, 4*f*, 5*f*, 6*f* and 7*f* represents numeral 8.

Figure 14:
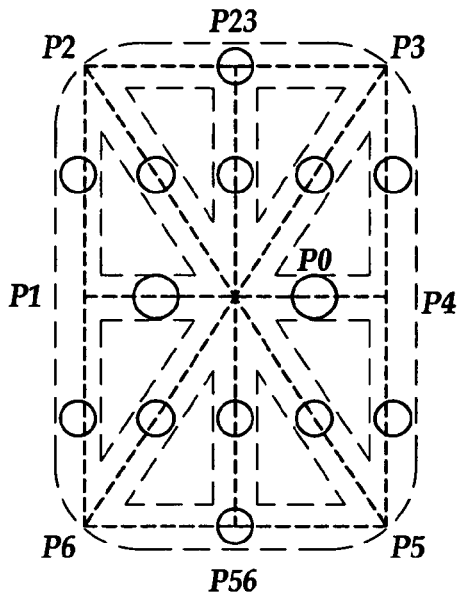
FIGS. 14 and 15 are diagrammatic views showing the stroke structure of an alternate embodiment of the invention.

FIG. 14 shows the stroke structure of a framed divided saltire type hand-writing board, wherein the stroke in the middle is divided into two strokes, each provided with a keypad. Specifically, said stroke structure includes P1P2, P2P3, P3P4, P4P5, P5P6, P6P1 and P0P1, P0P2, P0P23, P0P3, P0P4, P0P5, P0P56, P0P6.

Figure 15:
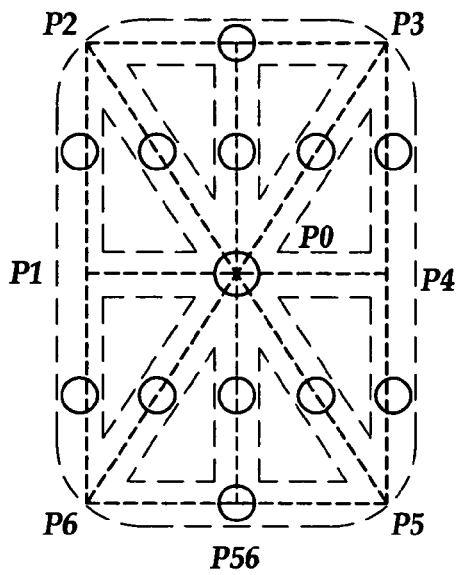

FIG. 15 is another embodiment of the present invention, which shows the plan view of the stroke segments of the framed divided saltire type hand-writing board and indicates the manner of arrangement of the stroke segments and switch element. As shown in this figure, the stroke segment structure drawing includes P1P2, P2P3, P3P4, P4P5, P5P6, P6P1 and P1P0P4, P0P2, P0P23, P0P3, P0P5, P0P56, P0P6 and the keypad is arranged on each stroke segment. In contrast to previously described embodiments, lengths P1P0 and P0P4 are combined into one stroke segment.

Figure 16:
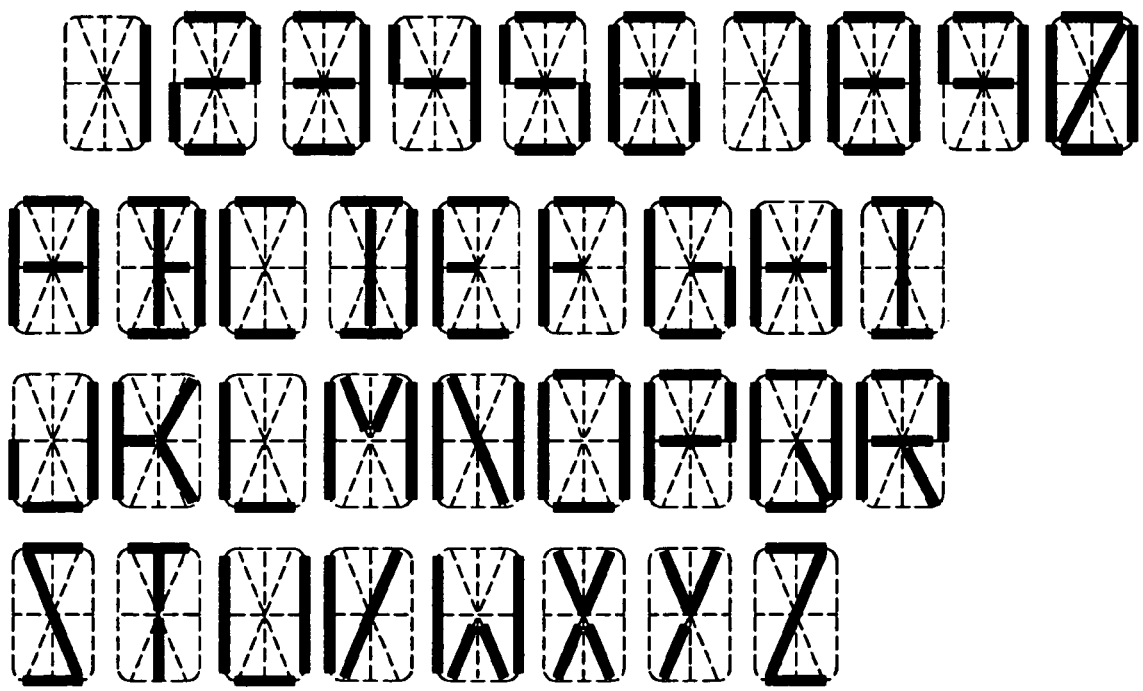
FIG. 16 is a view showing the stroke segments corresponding to letters or numerals when using the stroke segment structure shown in FIG. 14.

FIG. 16 shows the stroke segments corresponding to the letters or numerals when using the stroke segment structure drawing as shown in FIG. 14.

Based on the forgoing description, those skilled in the art may easily devise an appropriate table of the stroke structure corresponding to the letters or numerals as shown in FIG. 15.

Other variations of the present invention are possible. For example, the upper stroke segments and the lower lengths (P3P3, P5P6) in FIGS. 14 and 15 could also be divided into two stroke segments each.

Those skilled in the art will understand that based on the principles disclosed herein, other numbers of lengths could be adopted. For example, the first plurality of lengths need not be restricted to only six lengths, but rather they may include more or less lengths according to the requirements of a specific application. Obviously, the second plurality of lengths could also be altered accordingly.

The embodiments of the invention described above are merely illustrative of the invention. Those skilled in the art will recognize that numerous modifications and changes may be made to the embodiments disclosed herein without departing from the spirit and scope of the invention. For example, while resistive touch sensitive screens have been specifically disclosed for use as the keypads, those skilled in the art will recognize that numerous other devices and associated electronic circuits may be used to convert the stokes into characters. Mechanical switches, optical-electrical switches (as used in an optical-electrical mouse) or capacitive switches may be used to input stoke information instead of the disclosed touchpad. Furthermore, magnetic switches may be employed where a magnetic pen is used to input the strokes.

In addition, it should be noted that while the switch elements in the presently disclosed embodiments are substantially provided in the middle of the stroke segment, this is not a necessarily a requirement, as the switch elements need only be arranged somewhere along the stroke segments. Moreover, a plurality of switches could be provided on a stroke segment and under such case, an AND operation (when the triggered switch elements output low level) or and OR operation (when the triggered switch elements output high level) could be performed on the outputs of the switches on one stroke segment to obtain an output. Therefore, in the present description, while reference is frequently made to a single switch as forming a switch element, the switch element may comprise a plurality of switches, particularly if increased input sensitivity is desired.

Further, while the guidance device is described as a being concave, it could also be convex. In the former case, the switch element is provided within the concave shape, while in the latter, the switch element is provided within the convex shape. In addition, the cross-section of the guidance device in the disclosed embodiments is exemplified as a trapezoid, while obviously, other shapes would be satisfactory, such as a semicircle.

As previously noted, the above-mentioned guidance device enables the user to perform blind input based on touch. However, the user may also use only vision to aid in inputting information, in which case the guidance device does not hinder or impede the input process.

Further, in the embodiments of the present invention, the shape of the stroke structure pattern is substantially rectangular, and the stroke structure pattern is substantially symmetrical; however, those skilled in the art will appreciate that the stroke structure pattern could be of any appropriate shape, and that a non-symmetrical pattern could also be used. For example, the point P0 may not necessarily located in the geometrical center of the pattern and the shape of the stroke structure pattern could be a rectangle, an ellipse, an 8-shape, parallelogram, pear-shape or polygon, etc.

Further, it is obvious that not only letters and numerals could be inputted, but also characters defined by the user, such as characters for controlling the capitalization of a letter.

Still further, the processing circuit of the present invention could either be combined with a hand-writing board that comprises an input surface, switch element, guidance device, or separated from it. For example, the hand-writing board could be coupled to the PC though appropriate connections and the PC could replace the processing circuit.

In the preferred embodiments of the present invention, only few keypads (7 or 11 keypads) are used to realize hand-writing input of letters, numerals and other characters. Compared with the currently available hand-writing input technique, the present invention reduces the number of keys and the size of the key board, simplifies the recognition software program and provides higher accuracy of recognition.

What is claimed is:

1. A hand-writing device for inputting characters, comprising:

an input surface;

a guidance device provided on said input surface and extending along a predetermined track for guiding hand-writing strokes to follow said predetermined track, said predetermined track including a plurality of stroke segments arranged for receiving hand-writing strokes to generate said input characters, wherein said plurality of stroke segments include a plurality of horizontal stroke segments, a plurality of vertical stroke segments, and a plurality of diagonal stroke segments, wherein said guidance device further includes a closed edge surface formed about an entire outer perimeter of said predetermined track, and wherein said guidance device further includes a plurality of interior projections spaced inward from said closed edge surface for guiding said hand-writing strokes to follow said predetermined track, wherein said closed edge surface and said plurality of interior projections identify an absolute position of said hand-writing strokes within said predetermined track; and a plurality of switch elements provided at positions on said predetermined track, wherein each stroke segment includes at least one respective switch element, wherein at least a certain of said switch elements being triggered by a hand-writing stroke to produce an output signal when a specific character is input by hand-writing, and wherein the combination of the output signals of said triggered switch elements correspond to the inputted character.

2. A hand-writing input device according to claim 1, wherein said predetermined track is a pattern composed of a first plurality of lengths and a second plurality of lengths, said first plurality of lengths including the lengths between each two adjacent points of a first plurality of points (Pi) sequentially arranged on a closed curve of the closed edge surface, and said second plurality of lengths is formed by a length starting from a point inside of said closed curve and ending at each of a second plurality of points (Pj) on said closed curve.

3. A hand-writing input device according to claim 2, wherein said first plurality of lengths includes six lengths (P1P2, P2P3, P3P4, P4P5, P5P6, and P6P1), which are formed by the curve between each two adjacent points of said first plurality of points (P1, P2, P3, P4, P5 and P6) sequentially arranged on said closed curve, and said second plurality of lengths includes six lengths (P0P1, P0P3, P0P4, P0P5, P0P6), which are formed by the length starting from a point (P0) inside of the closed curve and ending at each of the second plurality of points (P1, P2, P3, P4, P5 and P6).

4. A hand-writing input device according to claim 2, wherein said first plurality of lengths includes six lengths (P1P2, P2P3, P3P4, P4P5, P5P6, and P6P1), which are formed by the curve between each two adjacent points of said first plurality of points (P1, P2, P3, P4, P5 and P6) sequentially arranged on said closed curve, and said second plurality of lengths includes two lengths (P0P1 and P0P4) which are formed by the length starting from a point (P0) inside of the closed curve and ending at each of said second plurality of points (P1 and P4).

5. A hand-writing input device according to claim 2, wherein said first plurality of lengths includes six lengths (P1P2, P2P3, P3P4, P4P5, P5P6, and P6P1), which are formed by the curve between each two adjacent points of said first plurality of points (P1, P2, P3, P4, P5 and P6) sequentially arranged on said closed curve, and said second plurality of lengths includes eight lengths (P0P1, P0P2, P0P23, P0P3, P0P4, P0P5, P0P56 and P0P6), which are formed by the length starting from a point (P0) inside of the closed curve and ending at each of the second plurality of points (P1, P2, P23, P3, P4, P5, P56 and P6).

6. A hand-writing input device according to claim 2, wherein the pattern formed by the first plurality of lengths and the second plurality of lengths is substantially axially symmetric.

7. A hand-writing input device according to claim 2, wherein the pattern formed by the first plurality of lengths and the second plurality of lengths is non-symmetrical.

8. A hand-writing input device according to claim 2, wherein the closed curve formed by said first plurality of lengths is one from the group including a rectangle, an ellipse, and a figure 8.

9. A hand-writing input device according to claim 2, wherein said plurality of switch elements are positioned on each of said first plurality of lengths, and on at least one of two lengths (P1P0 and P0P4) in said second plurality of lengths.

10. A hand-writing input device according to claim 1, wherein said guidance device comprises a visual guidance device including a visual guide track.

11. A hand-writing input device according to claim 1, wherein said guidance device comprises a recess having one of said switch elements therein.

12. A hand-writing input device according to claim 1, wherein said guidance device comprises a protrusion having one of said switch elements thereon.

13. A hand-writing input device according to claim 11, wherein the cross-section of said recess is substantially trapezoidal.

14. A hand-writing input device according to claim 11, wherein the cross-section of said recess is substantially semicircular.

15. A hand-writing input device according to claim 12, wherein the cross-section of said protrusion is substantially trapezoidal.

16. A hand-writing input device according to claim 12, wherein the cross-section of said protrusion is substantially semicircular.

17. A hand-writing input device according to claim 1, wherein said switch element is a resistive switch.

18. A hand-writing input device according to claim 1, wherein said switch element is an electro-optical switch.

19. A hand-writing input device according to claim 1, wherein said switch element is a capacitive switch.

20. A hand-writing input device according to claim 1, wherein said input surface includes a touch sensitive screen.

21. A hand-writing input device according to claim 20, wherein said switch element is a resistive switch comprising a keypad defined on said touch sensitive screen.

22. A hand-writing input device according to claim 1, wherein said input characters include numerals, letters and characters defined by the user.

23. A hand-writing input device according to claim 1, wherein the hand-writing input device further includes a micro-processor unit and a memory, said micro-processor unit obtaining codes of characters corresponding to said switch signal combinations from a predetermined inquiry table stored in said memory.

24. A hand-writing input device according to claim 20, wherein the hand-writing input device further includes a micro-processor unit and a memory, said micro-processor unit obtaining codes of characters corresponding to said switch signal combinations from a predetermined inquiry table stored in said memory based on the combination of switch signals produced by said touch sensitive screen.

25. A hand-writing input device according to claim 23, wherein the hand-writing device further includes a serial output interface.

26. A hand-writing input device according to claim 23, wherein the hand-writing device further includes a parallel communication output interface.

27. A hand-writing input device according to claim 23, wherein the hand-writing device further includes a USB output interface.

28. A hand-writing input device according to claim 23, wherein the hand-writing device further includes an infrared output interface.

29. A hand-writing input device according to claim 23, wherein the hand-writing device further includes a blue-tooth output interface.

* * * * *